T. MIDGLEY.
STEAM CONNECTION FOR HOLLOW CORES.
APPLICATION FILED JAN. 28, 1920.

1,377,214.

Patented May 10, 1921.

INVENTOR
Thomas Midgley.
BY
Franklin G. Neal.
ATTORNEY

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

STEAM CONNECTION FOR HOLLOW CORES.

1,377,214. Specification of Letters Patent. Patented May 10, 1921.

Application filed January 28, 1920. Serial No. 354,621.

*To all whom it may concern:*

Be it known that I, THOMAS MIDGLEY, residing at Hampden, county of Hampden, State of Massachusetts, have invented certain new and useful Improvements in Steam Connections for Hollow Cores, of which I declare the following to be a full, clear, and exact description.

This invention relates to means for connecting the hollow interiors of cores used in the manufacture of tire casings with a source of steam supply.

It has for its object a steam connection which will be proof against breakage during the operation of building the tire upon the core.

It has for a further object a steam connection which can be readily sealed to prevent, during the building operation, leakage of water condensed during a previous heat.

It has further objects relating to constructional and operating advantages which will appear from the ensuing description and the appended claims.

The invention will now be described with particular reference to the accompanying drawings, in which—

Figure 1:
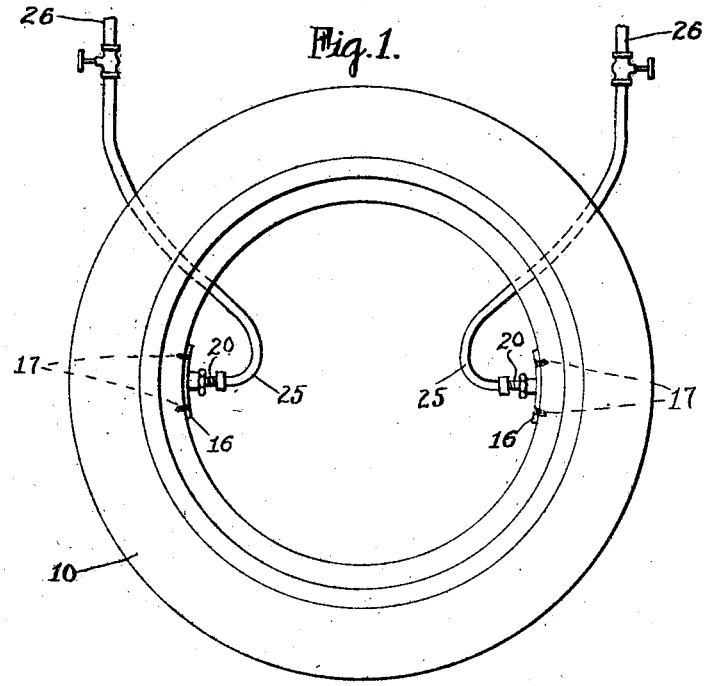
Figure 1 is a side elevation of a core embodying my improved steam connection, the core being shown as connected to a source of steam supply.
Figure 2:
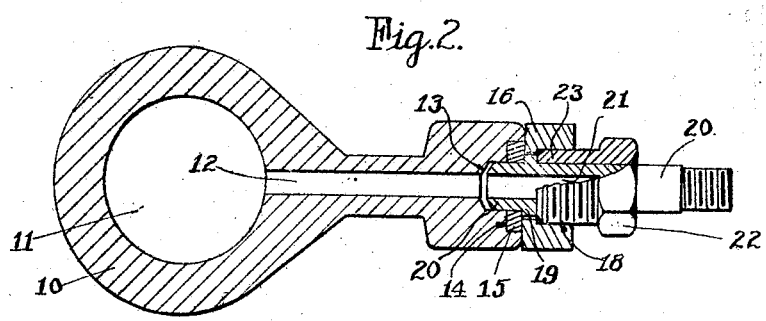
Fig. 2 is a sectional view of the core and the connection.
Figure 3:
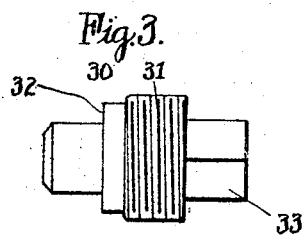
Fig. 3 is a detail of a plug used to seal the core during the tire building operation.

The core 10 may be of any suitable type having a chambered interior 11, but is here shown as being of the single piece type used in the manufacture of clencher tires. It will be understood, however, that the invention is equally applicable to cores of the collapsible or sectional type. The steam connections, which are in duplicate, one for the inlet and one for exhaust, are constructed as follows.

A passageway 12 leads from chamber 11 to a recess 13 adjacent the inner periphery of the core. A countersunk portion 14 of this recess receives an annular gasket 15 of any suitable material, such as copper lined with asbestos. A plate 16 is secured to the inner periphery of the core as by screws 17, and has a threaded hole 18 registering with the hole in the gasket but of somewhat larger diameter. Adapted to slide freely in hole 18, and having a flange 19 adapted to abut against gasket 15, is a tube 20 having a passageway 21 registering with passageway 12. A nut 22 having a threaded portion 23 engages the threaded hole 18 and forces the flange 19 against the gasket. To the end 24 of tube 20 a steam pipe or flexible hose leading to a suitable supply or exhaust pipe 26 may be attached in any preferred manner.

In order to seal the hole 18 to prevent leakage of condensed water during the operation of building the tire upon the core a solid plug 30 is provided, having a threaded portion 31 to engage the threads in hole 18, a shoulder 32 to press against gasket 15, and a squared head 33 by which it can be grasped with a wrench. This plug is adapted to replace tube 20 and nut 22.

The method of use of the above described connection will now be described. During the heat tube 20 and nut 22 are in place with shoulder 19 abutting against gasket 15, thus effectively preventing leakage of steam. When the cure is finished, nut 22 is unscrewed, tube 20 removed from hole 18, and this hole filled by plug 30 which remains in place during the building of the next tire. The condensed water may be emptied from the core before inserting plugs 30 if desired. It will be noticed that plug 30 lies very little above plate 16, and that it is a solid member, and not fragile like a projecting piece of pipe. Great difficulty has been experienced with the connections heretofore in use on account of breakage of the connection during the handling of the core in the tire building operation. My improved connection entirely avoids trouble due to this cause, as the plate 16 and plug 30 are the only parts projecting from the core, and each of these project but a short distance and can be made very substantial.

A further advantage of my construction is that the holes in the core can be readily and tightly sealed during the building operation, as gasket 15 is held in place by plate 16 after the tube 20 and nut 22 are removed.

What I claim as new and desire to secure by Letters Patent is:

1. A steam connection for a hollow core comprising a plate attached to the inner periphery of the core, a gasket retained in position by said plate, a tube adapted for connection to a steam pipe and having a shoulder adapted to abut against the gasket, and a nut threaded into said plate and adapted to force the shoulder of the tube against the gasket.

2. A steam connection for a hollow core comprising a plate attached to the inner periphery of the core, a gasket retained in position by said plate, and means adapted for connection with a source of steam and adapted to abut against said gasket.

3. A steam connection for a hollow core comprising a passageway leading from the hollow portion of the core to its inner periphery, a gasket surrounding said passageway and retained permanently in place on the core, and means on the core to receive in abutting relation to the gasket either connecting means to a source of steam or a plug to prevent leakage.

4. A steam connection for a hollow core comprising a gasket retained permanently in place upon the core, and removable means adapted to press against said gasket and adapted for connection with a source of steam.

5. A steam connection for a hollow core comprising a gasket, means to retain the gasket permanently on the core, and means on the core to receive in abutting relation to the gasket either connecting means to a source of steam or a plug to prevent leakage.

THOMAS MIDGLEY.